United States Patent [19]

Benson

[11] Patent Number: 4,740,140

[45] Date of Patent: Apr. 26, 1988

[54] PUMP HAVING INTEGRAL SWITCH AND BYPASS VALVE

[75] Inventor: Roger Benson, Rockford, Ill.

[73] Assignee: Sundstrand Corporation, Rockford, Ill.

[21] Appl. No.: 58,647

[22] Filed: Jun. 3, 1987

Related U.S. Application Data

[63] Continuation of Ser. No. 807,518, Dec. 11, 1985, abandoned.

[51] Int. Cl.[4] ........................ F04B 21/02; F04B 49/02; B01D 35/14; F16K 37/00

[52] U.S. Cl. ........................................ 417/63; 417/310; 137/552; 137/554; 137/557; 116/268; 210/90; 340/607

[58] Field of Search .......................... 417/63, 307, 310; 137/552, 554, 557; 116/268, 70; 210/90; 340/607, 611

[56] References Cited

U.S. PATENT DOCUMENTS

| | | | |
|---|---|---|---|
| 2,305,519 | 12/1942 | Dunmire | 417/310 |
| 2,887,058 | 5/1959 | Aspelin et al. | 417/310 |
| 3,146,720 | 9/1964 | Henry . | |
| 3,182,596 | 5/1965 | Prijatel . | |
| 3,566,901 | 3/1971 | Swedberg . | |
| 3,626,474 | 12/1971 | Hammer | 137/554 |
| 3,644,915 | 2/1972 | McBurnett | 340/607 |
| 3,828,812 | 8/1974 | Read | 137/557 |
| 3,896,280 | 7/1975 | Blake | 137/554 |
| 3,970,104 | 7/1976 | Decker et al. | 137/554 |
| 4,255,093 | 3/1981 | Erikson . | |
| 4,284,386 | 8/1981 | Hudson . | |
| 4,423,751 | 1/1984 | Roettgen | 137/557 |

FOREIGN PATENT DOCUMENTS

| | | | |
|---|---|---|---|
| 3132212 | 3/1983 | Fed. Rep. of Germany | 137/554 |
| 349048 | 11/1937 | Italy . | |
| 1510357 | 8/1975 | United Kingdom . | |

*Primary Examiner*—John J. Vrablik
*Attorney, Agent, or Firm*—Wood, Dalton, Phillips, Mason & Rowe

[57] ABSTRACT

To provide a filter bypass and indicator, in a pump having an inlet and an outlet with a filter therein, a bypass port is in communication with the outlet upstream of the filter. A bypass valve assembly is provided in the bypass port and is normally in a closed position to direct all flow from the pump inlet through the filter. The bypass valve assembly opens in response to a preselected pressure differential across the filter to divert at least a portion of flow from the inlet around the filter. In addition, the bypass valve assembly includes a switch actuator and the pump includes a switch positioned in proximity to the bypass valve assembly so as to be operable in response to movement of the switch actuator.

20 Claims, 4 Drawing Sheets

PUMP HAVING INTEGRAL SWITCH AND BYPASS VALVE

This application is a continuation of application Ser. No. 807,518 filed Dec. 11, 1985, abandoned.

FIELD OF THE INVENTION

The present invention relates to a pump having an inlet and an outlet with a filter therein, and more specifically, to a pump having an integral switch and bypass valve.

BACKGROUND OF THE INVENTION

In many pump applications utilizing a filter, it is recognized that the filter may eventually be clogged by substances in the material being pumped. This can be a critical problem in fuel pumps for aircraft, for example, where there may be a failure to provide fuel to an engine under such circumstances. Because of the critical nature of such fuel pumps, it has been necessary to devise bypass valves for diverting fuel around a clogged filter during flight.

Since the pressure upstream of the filter in the outlet of the pump will rise in the event the filter is clogged, it is desirable to provide a pressure sensitive bypass valve in the outlet to divert the fuel around the filter at a selected pressure above the normal operating pressure. This will ensure continuing operation of the aircraft since the engine will receive an uninterrupted flow of fuel through the bypass valve. However, while it is acceptable to operate the aircraft on unfiltered fuel for a relatively short time period, the filter should be replaced in accordance with normal maintenance procedures before any prolonged aircraft operation.

Because of this important factor in aircraft maintenance, the pilot should be given a warning at the instant the aircraft is operating on unfiltered fuel. In fact, as an extra precaution, the pilot should ideally receive advance notice of a pressure build up in the outlet upstream of the filter even prior to the time the bypass valve opens to divert fuel around the filter, after which the filter may be replaced utilizing normal maintenance procedures even before the filter becomes clogged to the point of causing the bypass valve to be opened. Despite the recognized desirability for an integral switch and bypass valve, there has been no known commercially acceptable fuel pump incorporating components in a reliable fashion.

Among the various fuel pumps proposed is that disclosed in Prigatel U.S. Pat. No. 3,182,596. This fuel pump is of the intermeshing gear type and is principally directed to overcoming the problems presented when bubbles are present in the fluid entering the pump inlet. For this purpose, the pump includes a pressure relief valve permitting fuel in auxiliary inlet passages to return to a main inlet passage.

Similarly, Henry U.S. Pat. No. 3,146,720 discloses a pressure relief valve for a hydraulic pump of the positive displacement type. The pressure relief valve is utilized with a gear pump to control the effects of variations or pulsations in the outlet in response to the quantities or surges of fluid positively displaced by the gear pump. However, the pressure relief means neither bypasses a filter nor actuates an indicator.

A fuel burner regulating valve assembly is disclosed in commonly owned Swedberg U.S. Pat. No. 3,566,901. This fuel regulating valve includes a main regulating valve for controlling the supply of fuel to a burner nozzle and a flow responsive valve upstream of the main regulating valve for bypassing fluid from the main valve until a predetermined flow rate is achieved, together with a variable orifice for providing a pressure drop that controls the flow responsive valve. With the variable orifice located in the supply passage to the main regulating valve, it is automatically operative to change its effective area with flow rates above a predetermined flow rate to maintain a substantially constant pressure drop thereacross.

Despite the efforts to control or eliminate the problems that are encountered in utilizing fuel pumps, there has been no integral switch and bypass valve for such pumps. It is, therefore, desirable to provide such an arrangment which operates in a highly effective and reliable manner to permit fuel to bypass a clogged filter in order to ensure uninterrupted flow of fuel to an engine during flight. Accordingly, the present invention is directed to overcoming the above stated problems and accomplishing the stated objects.

SUMMARY OF THE INVENTION

It is a principal object of the present invention to provide a pump having an integral switch and bypass valve. More specifically, it is an object of the invention to provide a fuel pump wherein a bypass valve and integral switch are operative in response to increases in differential pressure across a filter due to the filter becoming increasingly clogged by debris. It is likewise an object of the invention to provide a fuel pump having both impending and actual bypass indicators.

An exemplary embodiment of the invention achieves the foregoing objects in a pump having an inlet and an outlet with filter means therein. The pump includes a bypass port in communication with the outlet upstream of the filter means together with a bypass valve assembly in the bypass port. With this construction, the bypass valve assembly is normally in a closed position to direct all flow from the inlet through the filter means, but opens in response to an increase in differential pressure across the filter means.

In the exemplary embodiment the bypass valve assembly in the open position diverts at least a portion of flow from the inlet around the filter means. It is also advantageous for the bypass valve assembly to have switch actuating means associated therewith. In addition, a switch is positioned in proximity to the bypass valve assembly and is operable in response to movement of the switch actuating means.

In a specific embodiment, the bypass valve assembly includes a sliding valve member disposed in the bypass port. The sliding valve member is movable between the closed position and the open position and means are provided for normally biasing the sliding valve member toward the closed position. With the bypass port being generally cylindrical in shape, the sliding valve member can be a generally cylindrical sleeve adapted for lubricated frictional sliding movement in the cylindrical bypass port.

Additionally, the bypass port preferably includes a ring in communication with the outlet downstream of the filter means and the cylindrical sleeve of the sliding valve member then can preclude flow through the ring and around the filter means when the sliding valve member is in the closed position. But, due to a plurality of circumferentially spaced openings in the cylindrical sleeve, it accommodates flow through the ring and around the filter means when the sliding valve member is in the open position. Additionally, the sliding valve member preferably includes a piston integral with the cylindrical sleeve together with a second sliding piston independently movable from a first position corresponding to the closed position of the sliding valve member to a second position corresponding to the open position of the sliding valve member.

With this construction, the biasing means preferably includes a first spring acting against the piston integral with the cylindrical sleeve to normally maintain the sliding valve member in the closed position and a second spring acting against the second sliding piston to normally maintain the sliding piston in the first position. Preferably, the second spring provides less resistance to movement of the second piston from the first to the second position than the spring acting against movement of the piston integral with the cylindrical sleeve provides to movement from the closed to the open position. As a result, by providing switch actuator means associated with both the piston integral with the cylindrical sleeve and the second sliding piston, the switch can be operable to indicate a first preselected differential pressure across the filter means representative of an impending condition before a valve will divert at least a portion of flow from the inlet around the filter means as well as to indicate a second preselected higher differential pressure across the filter means representative of an actual condition where a valve is diverting at least a portion of flow from the inlet around the filter means.

Other objects and advantages of the present invention will become apparent from the following specification taken in connection with the accompanying drawings.

DESCRIPTION OF THE PREFERRED EMBODIMENT

Figure 1:
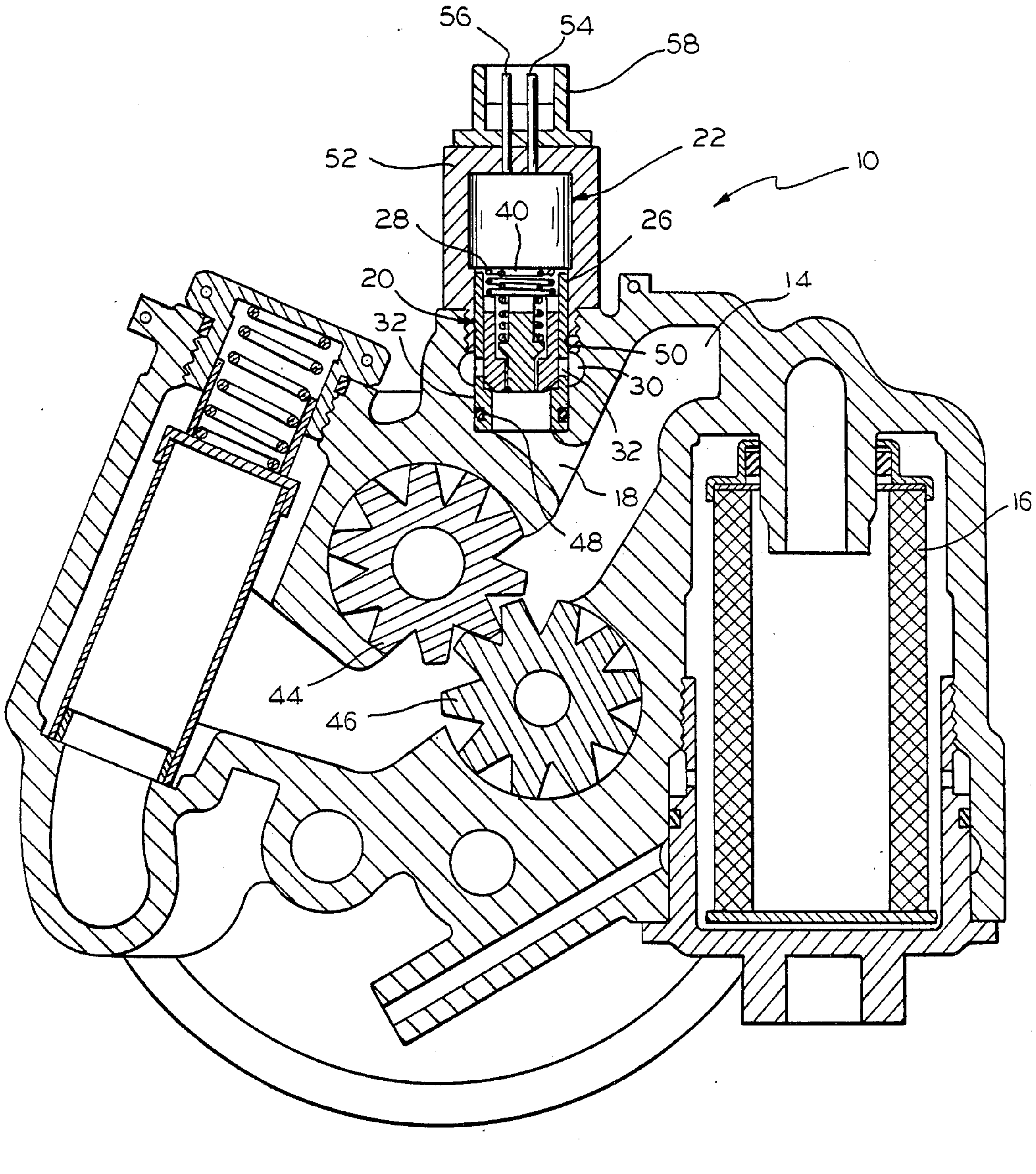
FIG. 1 is a cross sectional view of a pump in accordance with the present invention.

An exemplary embodiment of a pump having an integral switch and bypass valve in accordance with the invention is illustrated in FIG. 1. The pump 10, which can advantageously be a gear pump for use in fuel systems of aircraft, has an inlet 12 and an outlet 14 with filter means 16 therein. In addition, the pump 10 includes a bypass port 18 in communication with the outlet 14 upstream of the filter means 16 and a bypass valve assembly 20 in the bypass port 18.

Figure 2:
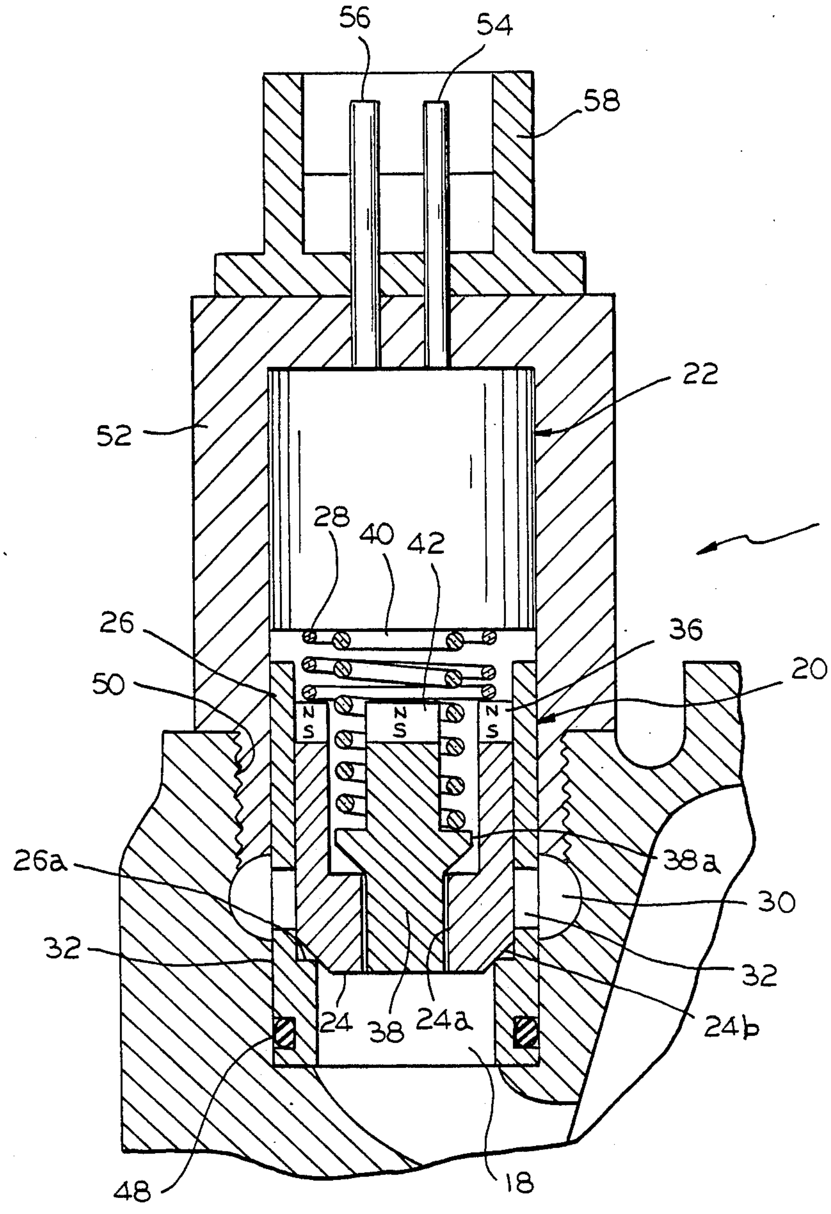
FIG. 2 is an enlarged cross sectional view illustrating the integral switch and bypass valve thereof in a first position.
Figure 4:
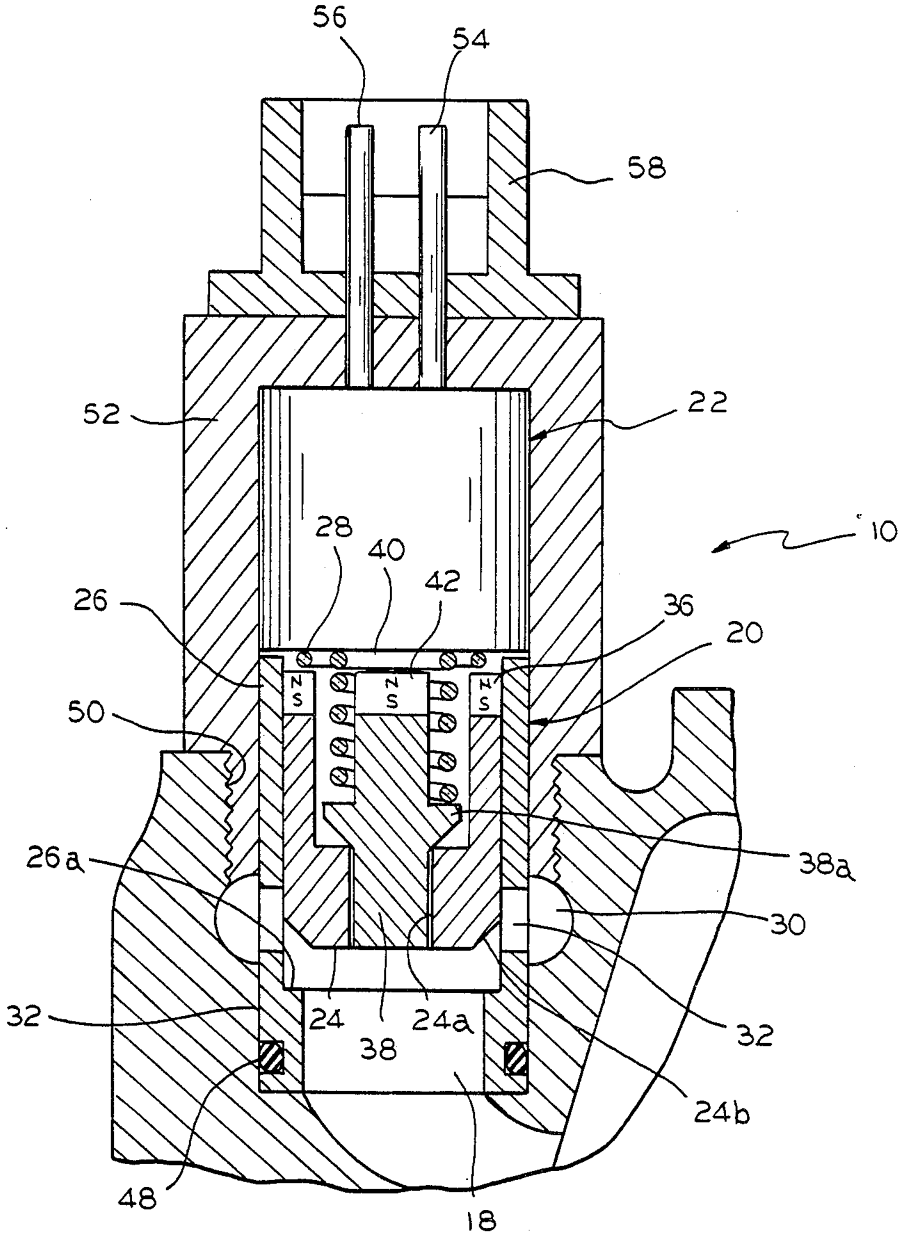
FIG. 4 is an enlarged cross sectional view illustrating the integral switch and bypass valve thereof in a third position.

As shown in FIG. 2, the bypass valve assembly normally is in a closed position to direct all flow from the inlet 12 through the filter means 16. It will be appreciated that the bypass valve assembly 20 will open in response to an increase in differential pressure across the filter means 16 due to the filter becoming increasingly clogged by debris and, in the open position, the bypass valve assembly 20 will divert at least a portion of flow from the inlet 12 around the filter means 16 (see FIG. 4). Additionally, the bypass valve assembly 20 includes switch actuating means associated therewith together with a switch 22.

As best shown in FIG. 2, the bypass valve assembly 20 includes a sliding valve member 24 in the form of a piston disposed in the bypass port 18 to normally preclude flow around the filter means 16. The sliding valve member 24 is movable between the closed position illustrated and an open position (see FIG. 4) and, as shown, the bypass port 18 is generally cylindrical in shape with the sliding valve member 24 adapted for lubricated frictional sliding movement within a generally cylindrical sleeve 26 in the cylindrical bypass port 18. Also, as shown in FIG. 2, the bypass valve assembly 20 includes means normally biasing the sliding valve member 24 toward the closed position such as the spring 28 disposed to act against movement of the sliding valve member 24.

With this construction, the bypass port 18 includes a ring 30 in communication with the outlet 14 at a point downstream of the filter means 16. The sliding valve member 24 normally precludes flow through the ring 30 and around the filter means 16 when in the closed position. However, since the cylindrical sleeve 26 has a plurality of circumferentially spaced openings 32, the cylindrical sleeve 26 can accommodate flow through the ring 30 and around the filter means 16 when the sliding valve member 24 is in the open position.

Figure 3:
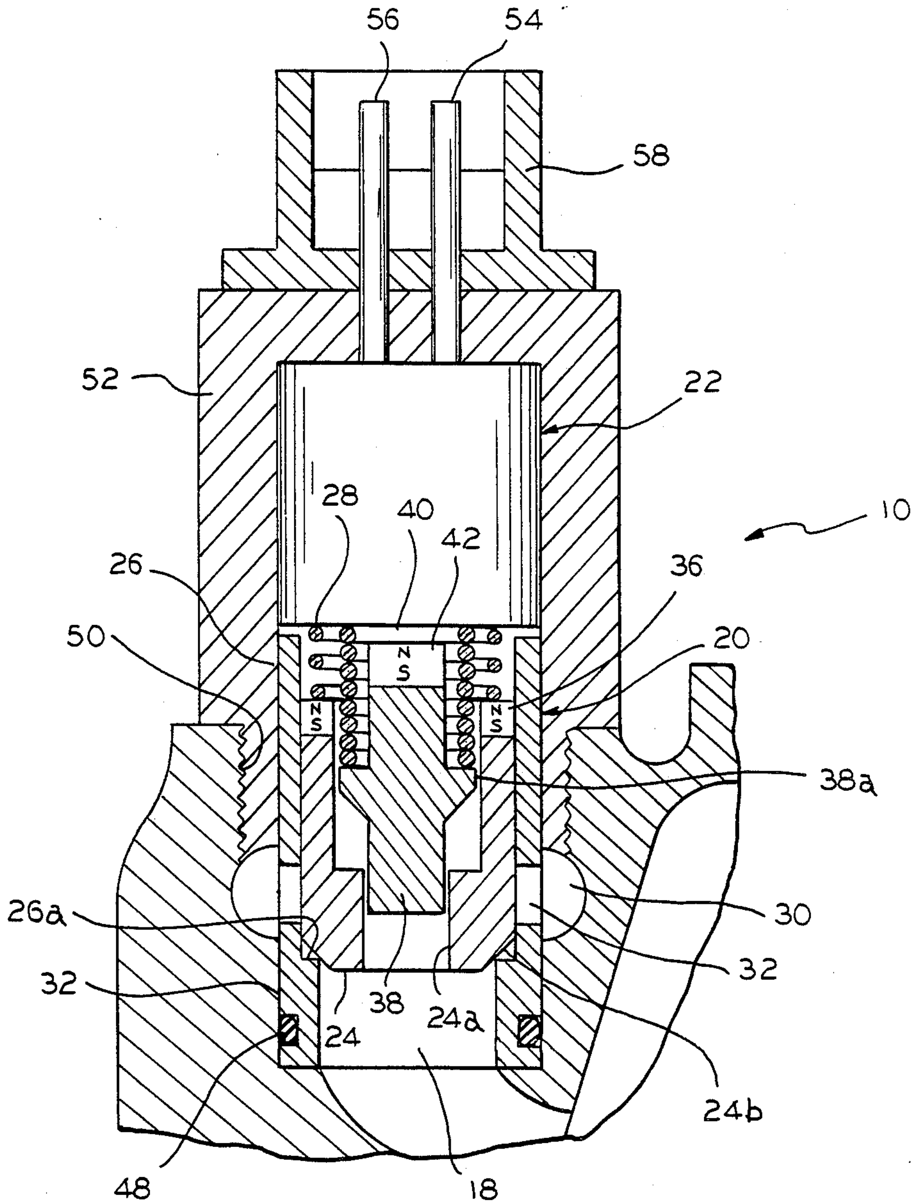
FIG. 3 is an enlarged cross sectional view illustrating the integral switch and bypass valve thereof in a second position.

Referring again to FIG. 2, the switch actuating means is preferably a ring magnet 36 associated with the sliding valve member 24 at a point remote from the outlet 14 and from the ring 30 to cooperate with the switch 22 which is preferably magnet actuated to indicate a preselected differential pressure across the filter means 16 due to clogging by debris. This will occur when at least a portion of flow from the inlet 12 is being diverted around the filter means 16 by reason of the sliding valve member 24 moving from the position shown in FIG. 2 and the position shown in FIG. 4. In addition, the sliding valve member 24 may include a sliding piston 38 disposed radially inwardly of the cylindrical sleeve 26 and independently movable from a first position corresponding to the closed position of the sliding valve member 24 to a second position corresponding to the open position of the sliding valve member 24 (compare FIGS. 2 through 4).

With this construction, the bypass valve assembly 20 includes a second spring 40 to independently act against movement of the sliding piston 38. As illustrated, the spring 40 acts between the switch 22 and a radially outward frustoconical extension **38*a* of the sliding piston 38 which serves to retain the sliding piston 38 within the bore 24*a* of the sliding valve member 24 against the biasing force of the spring 40 under normal operating conditions (see FIG. 2). As a result, the second spring 40 acts against the sliding piston 38 to normally maintain the sliding piston 38 in the first position, as illustrated in FIG. 2**.

In the preferred embodiment, the second spring 40 provides less resistance to movement of the sliding piston 38 from the first to the second position than the spring 28 provides against movement of the sliding valve member 24 from the closed to the open position. It will also be seen that the switch actuating means preferably includes another cylindrical magnet 42 associated with the sliding piston 38 remote from the outlet 14 and from the ring 30 with the switch 22 again being magnet actuated. Specifically, the switch 22 is operable to indicate a first preselected differential pressure across the filter means 16 representative of an impending condition where at least a portion of flow will be diverted around the filter means 16 when the sliding piston 38 moves from the first position (see FIG. 2) to the second position (see FIG. 3) before movement of the sliding valve member 24 from the closed position (see FIG. 3) to the open position (see FIG. 4).

As will be appreciated by those skilled in the art, the fuel pump 10 normally pumps fuel from a tank (not shown), into the inlet 12, into the outlet 14, and through the filter means 16. This is accomplished by means of the intermeshing gears 44 and 46 disposed between the inlet 12 and the outlet 14 and, inasmuch as the major components of the fuel pump 10 are known to those skilled in the art, they will not be described herein. Moreover, it will be appreciated by those skilled in the art that the integral switch 22 and bypass valve assembly 20 of the invention may also be utilized on a number of different types of pump.

As previously suggested, the bypass valve assembly 20 makes it possible to selectively divert fuel in the outlet 14 around the filter means 16. Under normal operating conditions, the bypass valve assembly 20 is in a closed position (FIG. 2) to direct all fuel in the outlet 14 through the filter means 16. However, in response to a preselected pressure differential across the filter means 16, the bypass valve assembly 20 opens such that fuel may flow through the circumferentially spaced openings 32 aligned with the ring 30. Under clogged filter conditions, the bypass valve assembly 20 will therefore divert fuel in the outlet 14 around the filter means 16. In other words, the preselected pressure differential caused by the clogged filter means 16 is the condition under which fuel is selectively diverted through the bypass port 18, through the bypass valve assembly 20, and to the outlet 14 downstream of the filter means 16.

While a specific embodiment of the invention has been illustrated herein, it will be appreciated that several variations are available. For instance, the sliding valve member 24 can be provided with a single switch actuating means such as the magnet 36 in which case the switch 22 positioned in proximity to the sliding valve member 24 is operable only in response to movement of the switch actuating means or magnet 28, i.e., when the sliding valve member 24 moves from the closed position (FIG. 2) to the open position (FIG. 4), to indicate only a preselected pressure differential across the filter means 16 representative of an actual condition where the bypass valve assembly 20 is diverting at least a portion of fuel in the outlet 14 around the filter means 16. Alternatively, the bypass valve assembly 20 may be constructed to have a single switch actuating means such as the magnet 42 in which case the switch 22 in proximity to the sliding piston 38 is operable only in response to movement of the switch actuating means or magnet 42, i.e., when the sliding piston 38 moves from the first position (FIG. 2) to the second position (FIG. 3), to indicate only a preselected pressure differential across the filter means 16 representative of an impending condition where the bypass valve assembly 20 will soon be diverting at least a portion of fuel in the outlet 14 around the filter means 16. In the former case, the sliding valve member 24 can be formed as a solid piston rather than having a bore **24*a* to receive the sliding piston 38**.

As will be appreciated by referring to the drawings, the illustrated embodiment incorporates both an impending and an actual fuel bypass indicator into the pump 10. This is accomplished by providing the sliding piston 38 within the sliding valve member 24 so as to be independently movable from a first position (FIG. 2) corresponding to the closed position of the sliding valve member 24 to a second position (FIG. 3) corresponding to the open position of the sliding valve member 24 (see, also, FIG. 4). In addition, the two springs 28 and 40 comprise independent means normally biasing the sliding valve member 24 and the sliding piston 38 toward the first and closed positions, respectively.

As previously suggested, the bypass port 18 selectively diverts fuel in the outlet 14 around the filter means 16. This can be controlled by selecting the spring constant of the respective springs 28 and 40 and, in the embodiment illustrated, the spring constant of the spring 40 will be less than that of the spring 28 so that the sliding piston 38 will move from the first to second position to signal impending bypass prior to movement of the sliding valve member 24 once actual bypass occurs. Until such time, the sliding valve member 24 is biased by the spring 28 to a position with the beveled surface **24*b* in engagement with the radial shoulder 26*a* of the cylindrical sleeve 26**.

When the filter means 16 begins clogging in operation, the pressure in the outlet 14 builds to provide an increased pressure in the bypass port 18. The sliding piston 38, which is self-lubricating since it is always in the fuel environment, will slide upwardly toward the switch 22 at the design pressure to signal impending bypass, i.e., the preselected pressure differential across the filter means 16. Similarly, depending upon fuel pressure, the sliding valve member 24 will slide upwardly at the design pressure and the switch 22 will signal actual bypass.

Since the sliding valve member 24 is also in the fuel environment, it will be self-lubricating to facilitate sliding movement. It will slide upwardly relative to the cylindrical sleeve 26 which is sealed within the bypass port 18 by means of an O-ring 48 until the circumferentially spaced openings 32 which are in alignment with the ring 30 divert fuel from the outlet 14 around the filter means 16 to a fuel control unit (not shown) prior to delivery to an engine of an aircraft. When this has occurred, the switch 22 will not only have signaled impending bypass by reason of movement of the magnet 42 toward the switch 22 but also will have signaled actual bypass by reason of movement of the magnet 36 toward the switch 22.

While the switch 22 has not been described in detail, it will be appreciated by those skilled in the art that it can be any of a variety of conventional switches operable in response to a change of magnetic field force. For instance, the switch 22 could be formed of a non-ferrous body having one or more internally disposed coils capable of delivering a signal in response to a change of magnetic field force caused by movement of either or both of the magnets 36 and 42 so as to provide both an actual bypass indicator as well as an impending bypass indicator due to two distinct voltage shifts. Since the operative sliding components are in a self-lubricating environment, the design pressures for sliding movement to give both impending and actual signals can be closely controlled.

As shown in FIG. 2, the pump 10 can be provided with an internally threaded opening 50 adapted to receive a threaded cap 52. The switch 22 can be provided with a pair of leads 54 and 56 which can, alternatively, take the form of male contacts extending through the cap 52 into a plug structure 58 adapted to receive a mating plug (not shown) having wires leading to one or more indicators, e.g., one light indicating impending bypass and another light indicating actual bypass, located in the cockpit of an aircraft. With this construction, the operative components of the integral switch and bypass valve can easily be assembled, repaired and/or replaced.

While not shown, it will be appreciated that the indicators can be constructed so as to render it impossible to reset without the needed maintenance. In other words, the indicator lights will remain on so long as the filter has not been replaced. In this manner, the required maintenance cannot be overlooked which might otherwise lead to engine damage or failure after prolonged use of unfiltered fuel.

While in the foregoing there has been set forth a preferred embodiment of the invention, it is to be understood that the invention is only to be limited by the spirit and scope of the appended claims.

I claim:

1. In a pump having an inlet and an outlet with filter means therein, the improvement comprising:

a bypass port upstream of said filter means and in communication with said outlet downstream of said filter means;

a bypass valve assembly in said bypass port, said bypass valve assembly normally being in a closed position to direct all flow from said inlet through said filter means, said bypass valve assembly opening in response to increased pressure in said bypass port, said bypass valve assembly in said open position diverting at least a portion of flow around said filter means, said bypass valve assembly having switch actuating means associated therewith; and a switch mounted in a fixed position in proximity to said bypass valve assembly;

said bypass valve assembly including a sliding valve member disposed in said bypass port, said sliding valve member being movable between said closed position and said open position, and including first means normally biasing said sliding valve member toward said closed position;

said sliding valve member normally precluding flow around said filter means when said sliding valve member is in said closed position;

said bypass valve assembly also including a sliding piston disposed inwardly of said sliding valve member, said sliding piston normally being in forced engagement with said sliding valve member to assist said first biasing means in maintaining said sliding valve member in said closed position but being independently movable from a first position corresponding to said closed position of said sliding valve member to a second position corresponding to said open position of said sliding valve member, and including second means normally biasing said sliding piston toward said first position to independently act against movement of said sliding piston;

said switch actuating means including separate switch actuating means associated with each of said sliding piston and said sliding valve member for movement therewith, said switch being initially operable in response to movement of said switch actuating means associated with said sliding piston against only said second biasing means from said first to said second position thereof at a first selected pressure differential across said filter means to activate first positive indicator means to indicate an impending condition before at least a portion of flow will be diverted around said filter means, said second biasing means providing less resistance to movement of said sliding piston from said first to said second position than said first biasing means provides against movement of said sliding valve member from said closed to said open position, said switch also being separately operable in response to movement of said switch actuating means associated with said sliding valve member against only said first biasing means from said closed to said open position thereof at a second selected pressure differential across said filter means to activate second positive indicator means to indicate an actual condition where at least a portion of flow will be diverted around said filter means, whereby said switch gives a positive indication of both an impending and an actual bypass condition.

2. The pump as defined by claim 1 wherein said switch actuating means includes a magnet associated with each of said sliding piston and said sliding valve member and said switch is magnet actuated, said sliding piston moving from said first to said second position before said sliding valve member moves from said closed to said open position due to the difference in resistance to movement of said first and second biasing means.

3. The pump as defined by claim 1 wherein said bypass port is generally cylindrical in shape, said sliding valve member being disposed in a generally cylindrical sleeve and being adapted for lubricated frictional sliding movement in said generally cylindrical sleeve, said first biasing means including a spring disposed to act against movement of said sliding valve member.

4. The pump as defined by claim 3 wherein said bypass port includes a ring in communication with said outlet downstream of said filter means, said sliding valve member normally precluding flow through said ring and around said filter means when said sliding valve member is in said closed position, said cylindrical sleeve having a plurality of circumferentially spaced openings to accommodate flow through said ring and around said filter means when said sliding valve member is in said open position.

5. The pump as defined by claim 4 wherein said sliding piston is disposed radially inwardly of said cylindrical sleeve, said second biasing means including a spring to independently act against movement of said sliding piston.

6. The pump as defined by claim 5 each of said second spring acts against said sliding piston to normally maintain said sliding piston in said first position, said switch actuating means associated with said sliding piston being remote from said outlet and from said ring.

7. The pump as defined by claim 4 wherein said switch actuating means associated with said sliding valve member is remote from said outlet and from said ring.

8. The pump as defined by claim 7 wherein each of said switch actuating means associated with said sliding valve member is a magnet and said switch is magnet actuated, said switch being operable to indicate that at least a portion of flow is being diverted from said inlet around said filter means.

9. In a fuel pump having an inlet and an outlet with filter means therein, the improvement comprising:

a bypass port upstream of said filter means and in communication with said outlet downstream of said filter means, said fuel pump normally pumping fuel from said inlet through said filter means in said outlet, said bypass port selectively diverting fuel in said outlet around said filter means;

a bypass valve assembly in said bypass port, said bypass valve assembly normally being in a closed position to direct all fuel in said outlet through said filter means, said bypass valve assembly opening in response to increased pressure in said bypass port, said bypass valve assembly in said open position diverting fuel in said outlet around said filter means, said increased pressure being the condition for selectively diverting fuel through said bypass port;

said bypass valve assembly including a sliding valve member in said bypass port, and first means normally biasing said sliding valve member toward said closed position, said sliding valve member having switch actuating means associated therewith; and a switch mounted in a fixed position in proximity to said sliding valve member;

said sliding valve member normally precluding flow around said filter means when said sliding valve member is in said clsoed position;

said bypass valve assembly also including a sliding piston disposed therewithin, said sliding piston normally being in forced engagement with said sliding valve member to assist said first biasing means in maintaining said sliding valve member in said closed position but being independently movable from a first position corresponding to said closed position of said sliding valve member to a second position corresponding to said open position of said sliding valve member, and including second biasing means to independently act against movement of said sliding piston;

said sliding piston also having switch actuating means associated therewith, said switch being initially operable in response to movement of said switch actuating means associated with said sliding piston from said first to said second position thereof at a first selected pressure differential across said filter means to activate first positive indicator means to indicate an impending condition before at least a portion of flow will be diverted around said filter means, said second biasing means providing less resistance to movement of said sliding piston from said first to said second position than said first biasing means provides against movement of said sliding valve member from said closed to said open position, said switch also being separately operable in response to movement of said switch actuating means associated with said sliding valve member from said closed to said open position thereof at a second selected pressure differential across said filter means to activate second positive indicator means to indicate an actual condition where at least a portion of flow will be diverted around said filter means, whereby said switch gives a positive indication of both an impending and an actual bypass condition.

10. The fuel pump as defined by claim 9 wherein said switch actuating means are magnets and said switch is magnet actuated.

11. The fuel pump as defined by claim 9 wherein said bypass port is generally cylindrical in shape, said sliding valve member being disposed within a generally cylindrical sleeve and being adapted for lubricated frictional sliding movement in said generally cylindrical sleeve, said first and second biasing means including separate springs disposed to act against movement of said sliding valve member and sliding piston, respectively.

12. The fuel pump as defined by claim 11 wherein said bypass port includes a ring in communication with said outlet downstream of said filter means, said sliding valve member normally precluding flow through said ring and around said filter means when said sliding valve member is in said closed position, said cylindrical sleeve having a plurality of circumferentially spaced openings to accommodate flow through said ring and around said filter means when said sliding valve member is in said open position.

13. The fuel pump as defined by claim 11 wherein said first and second springs act to normally maintain said sliding valve member and sliding piston in said closed and first positions, respectively.

14. In a fuel pump having an inlet and an outlet with filter means therein, the improvement comprising:

a bypass port upstream of said filter means and in communication with said outlet downstream of said filter means, said fuel pump normally pumping fuel from said inlet through said filter means in said outlet, said bypass port selectively diverting fuel in said outlet around said filter means;

a bypass valve assembly in said bypass port, said bypass valve assembly normally being in a closed position to direct all fuel in said outlet through said filter means, said bypass valve assembly opening in response to an increased pressure in said bypass port, said bypass valve assembly in said open position diverting fuel in said outlet around said filter means, said increased pressure being the condition for selectively diverting fuel through said bypass port;

said bypass valve assembly also including a sliding valve member in said bypass port movable between said closed position and said open position, a sliding piston within said sliding valve member normally in forced engagement wtih said sliding valve member to maintain said sliding valve member in said closed position but being independently movable from a first position corresponding to said closed position of said sliding valve member to a second position corresponding to said open position of said sliding valve member, and independent means normally biasing said sliding piston and said sliding valve member toward said first and closed positions, respectively;

said sliding piston and said sliding valve member each having switch actuating means associated therewith; and a switch mounted in a fixed position in proximity to said sliding piston and said sliding valve member and initially operable in response to movement of said switch actuating means associated with said sliding piston when said sliding piston moves from said first position to said second position to indicate an impending bypass condition and separately operable in response to movement of said switch actuating means associated with said sliding valve member when said sliding valve member moves from said closed position to said open position to indicate an actual bypass condition where fuel is diverted through said bypass port and around said filter means.

15. The fuel pump as defined by claim 14 wherein said independent biasing means includes a pair of springs with one of said springs acting against said sliding piston to normally maintain said sliding piston in said first position, the one of said springs providing less resistance to movement of said sliding piston from said first to said second position than the other of said springs acting against movement of said sliding valve member from said closed to said open position, said switch actuating means being associated with said sliding piston and said sliding valve member remote from said outlet and from said bypass port.

16. The fuel pump as defined by claim 15 wherein said switch actuating means are magnets and said switch is magnet actuated, said switch being operable to indicate an impending condition before at least a portion of flow is diverted from said inlet around said filter means, said sliding piston moving from said first to said second position before said sliding valve member moves from said closed to said open position due to the difference in resistance to movement of said springs.

17. The fuel pump as defined by claim 16 wherein said bypass port is generally cylindrical in shape, said sliding valve member being disposed in a generally cylindrical sleeve and being adapted for lubricated frictional sliding movement in said generally cylindrical sleeve.

18. The fuel pump as defined by claim 17 wherein said bypass port includes a ring in communication with said outlet downstream of said filter means, said sliding valve member normally precluding flow through said ring and around said filter means when said sliding valve member is in said closed position, said cylindrical sleeve having a plurality of circumferentially spaced openings to accommodate flow through said ring and around said filter means when said sliding valve member is in said open position.

19. The fuel pump as defined by claim 18 wherein the other of said springs acts against said sliding valve member to normally maintain said sliding valve member in said closed position, said sliding piston being disposed for sliding movement within said sliding valve member, and said switch actuating means are disposed remote from said outlet and from said ring.

20. The fuel pump as defined by claim 14 wherein said switch actuating means are magnets and said switch is magnet actuated.

* * * * *